US009579832B2

(12) United States Patent
MacKinnon et al.

(10) Patent No.: US 9,579,832 B2
(45) Date of Patent: *Feb. 28, 2017

(54) METHOD OF SHORTENING THE TIME TO COMPRESSION MOLD A ROOFING SHINGLE OR TILE AND APPARATUS FOR FACILITATING SAME

(71) Applicants: Thomas Kevin MacKinnon, Daniel Island, SC (US); David Nelson, Ontario (CA); Nolan Loy Son, Ontario (CA); Trevor Reeve, Ontario (CA)

(72) Inventors: Thomas Kevin MacKinnon, Daniel Island, SC (US); David Nelson, Ontario (CA); Nolan Loy Son, Ontario (CA); Trevor Reeve, Ontario (CA)

(73) Assignee: CertainTeed Corporation, Malvern, PA (US)

( * ) Notice: Subject to any disclaimer, the term of this patent is extended or adjusted under 35 U.S.C. 154(b) by 769 days.

This patent is subject to a terminal disclaimer.

(21) Appl. No.: 13/652,720

(22) Filed: Oct. 16, 2012

(65) Prior Publication Data

US 2013/0037994 A1    Feb. 14, 2013

Related U.S. Application Data

(60) Continuation of application No. 13/340,773, filed on Dec. 30, 2011, now abandoned, which is a division of
(Continued)

(51) Int. Cl.
*B29C 43/04* (2006.01)
*B29C 43/18* (2006.01)
(Continued)

(52) U.S. Cl.
CPC ............... *B29C 43/18* (2013.01); *B29C 43/34* (2013.01); *B29C 43/00* (2013.01);
(Continued)

(58) Field of Classification Search
CPC .................................. B29C 43/04; B29C 43/34
(Continued)

(56) References Cited

U.S. PATENT DOCUMENTS

| 4,747,864 | A  | * | 5/1988  | Hagerty et al. ................. 65/102 |
| 5,401,154 | A  | * | 3/1995  | Sargent ......................... 425/114 |
| 7,084,826 | B2 | * | 8/2006  | Aisenbrey ..................... 343/788 |
| 7,156,149 | B2 | * | 1/2007  | Mergen et al. ............... 164/461 |
| 7,745,355 | B2 | * | 6/2010  | Spohn et al. ................. 442/289 |
| 7,785,510 | B2 | * | 8/2010  | MacKinnon et al. ........ 264/148 |
| 8,017,052 | B2 | * | 9/2011  | MacKinnon et al. ........ 264/148 |
| 8,128,857 | B2 | * | 3/2012  | MacKinnon et al. ........ 264/319 |
| 8,337,188 | B2 | * | 12/2012 | MacKinnon et al. ..... 425/131.1 |
| 8,371,072 | B1 | * | 2/2013  | Shanes et al. .................... 52/43 |
| 2003/0127775 | A1 | * | 7/2003 | McDonald .................... 264/338 |
| 2006/0029775 | A1 | * | 2/2006 | MacKinnon et al. ........ 428/141 |
| 2010/0127425 | A1 | * | 5/2010 | MacKinnon et al. ..... 264/297.5 |
| 2010/0159053 | A1 | * | 6/2010 | MacKinnon et al. ..... 425/131.1 |

(Continued)

*Primary Examiner* — Alison L Hindenlang
(74) *Attorney, Agent, or Firm* — Paul & Paul

(57) ABSTRACT

A method of shortening cycle time required to compression mold shingle or tile is provided, wherein carrier plates are comprised of a surface material and a base, and receive a thermoplastic material, thereon. The roofing material is applied to the carrier plate and the carrier plate is subjected to induction heating, by which its surface material has its temperature raised, without substantially raising the temperature of the carrier plate base, such that the thermoplastic material applied thereto is kept heated in the compression mold. Cooling of the thermoplastic material is by heat transfer from the carrier plate surface material to the carrier plate base, and with both materials having good heat conduction capability. The carrier plate surface material has a high receptivity to being heated by induction heating relative the carrier plate base. The carrier plates are serially delivered through the process, to the compression mold.

18 Claims, 2 Drawing Sheets

Figure 1:
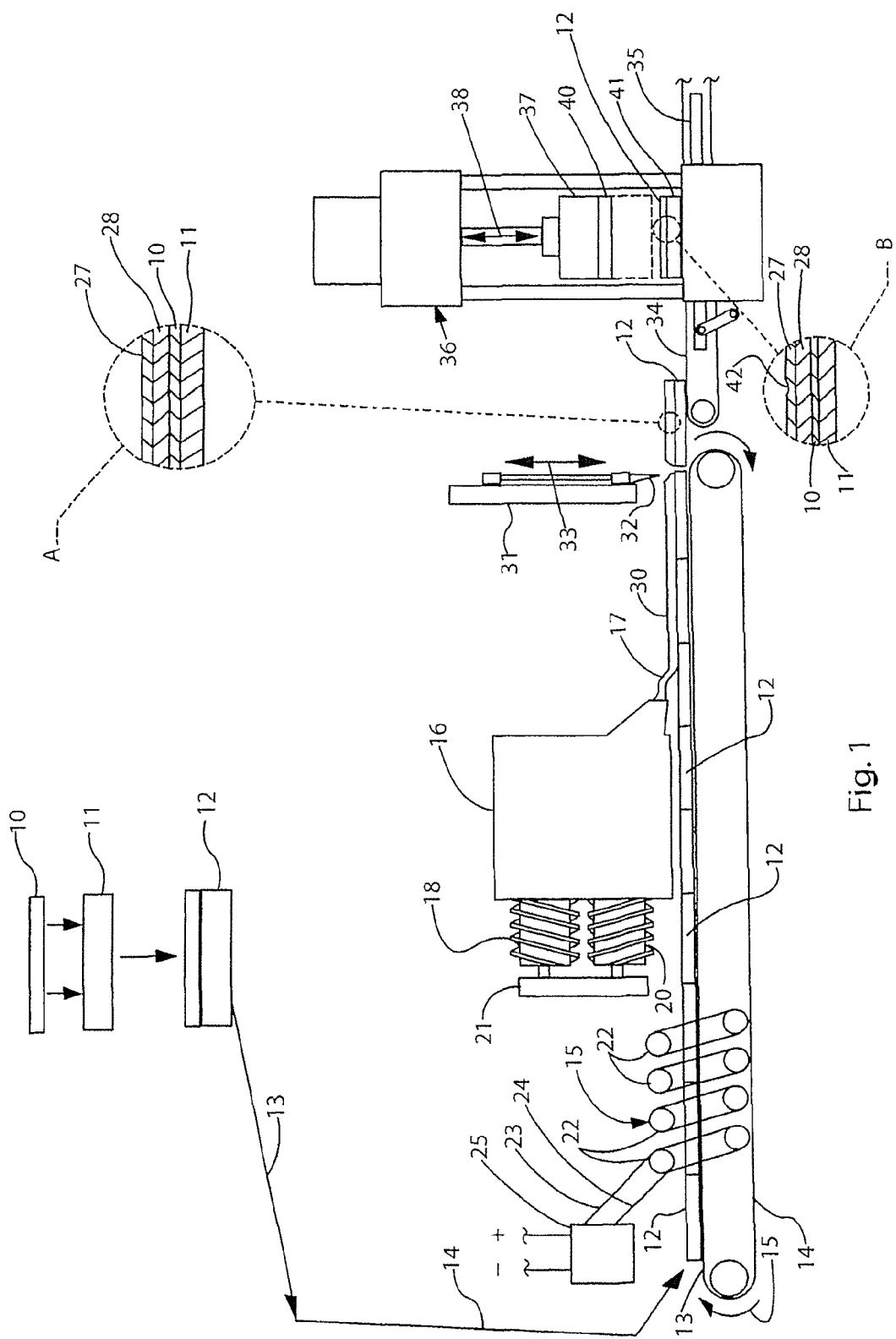

Related U.S. Application Data application No. 12/636,024, filed on Dec. 11, 2009, now Pat. No. 8,128,857.

(60) Provisional application No. 61/121,925, filed on Dec. 12, 2008.

(51) Int. Cl.
  *B29C 43/34* (2006.01)
  *B29C 43/00* (2006.01)
  *B29K 703/08* (2006.01)
  *B29L 31/10* (2006.01)

(52) U.S. Cl.
  CPC .............. *B29C 2043/3416* (2013.01); *B29C 2043/3433* (2013.01); *B29K 2703/08* (2013.01); *B29L 2031/104* (2013.01); *Y10T 442/3878* (2015.04)

(58) Field of Classification Search
  USPC .......... 264/210.2, 319, 472, 486; 249/79–80, 249/114.1–116, 134, 135; 425/253
  See application file for complete search history.

(56) References Cited

U.S. PATENT DOCUMENTS

| | | | | |
|---|---|---|---|---|
| 2010/0252956 A1* | 10/2010 | MacKinnon et al. | ........ | 264/299 |
| 2012/0107443 A1* | 5/2012 | MacKinnon et al. | ........ | 425/470 |

\* cited by examiner

METHOD OF SHORTENING THE TIME TO COMPRESSION MOLD A ROOFING SHINGLE OR TILE AND APPARATUS FOR FACILITATING SAME

CROSS-REFERENCE TO RELATED APPLICATIONS

This application is a continuation of U.S. Ser. No. 13/340,773 filed Dec. 30, 2011 (now abandoned), which in turn is a divisional of U.S. Ser. No. 12/636,024 filed Dec. 11, 2009, (now U.S. Pat. No. 8,128,857) which in turn is based upon U.S. provisional application 61/121,925, filed Dec. 12, 2008.

BACKGROUND OF THE INVENTION

In the art of making roofing shingles and tiles for exterior application in the building industry, various approaches have been made toward making shingles and tiles that are manufactured, but give the appearance of being made of traditional natural materials, such as wood cedar shakes, tiles, slate, etc.

In many instances, such shingles and tiles are made of bitumen coated mat having granules on the exterior surface, with the granules being provided in various designs, shades, color configurations, etc., to yield various aesthetic effects.

It is also known, in making roofing shingles and tiles, to mold them to the desired shape by various molding techniques. The materials that are used in such molding techniques usually include inexpensive filler material, in order to achieve low production costs.

Additionally, molding operations tend to be capital intensive, with relatively high manufacturing costs, although molding techniques do provide a high level of definition or dimension control. Also, there is a disadvantage to molding techniques, in general, in that the length of the cycle for injecting material into the mold, molding to the desired shape, and ejecting the shape from the mold is largely a function of the time required to cool the molten thermoplastic material before it can be removed from the mold. However, the temperature of the thermoplastic material must be sufficiently high that it can flow and fill the cavity within the constraints of the material and equipment (i.e. material characteristics, melt pressures, mold clamping pressures, etc.). While modifications can be made to the materials to help the flow characteristics and thereby lower the required melt temperature, and while improvements can be made to the mold to increase heat transfer and removal, cooling remains the longest part of the cycle for these processes. In order to achieve the necessary cooling, the time required causes a lengthening of the manufacturing cycle, which increases the capital costs of investment in molds and machinery for a required output, thereby substantially increasing manufacturing costs.

An example of one process for making a shingle or tile is disclosed in U.S. patent application Pub. No. U.S. 2006/0029775, the complete disclosure of which is herein incorporated by reference.

SUMMARY OF THE INVENTION

The present invention is directed to a process of making a shingle or tile having a desired configuration, including a desired outer surface configuration that, when installed on a roof, has a predetermined surface aesthetic for at least that portion of the shingle or tile that is planned to be weather-exposed in the installed condition, and wherein the process of molding the shingle or tile is one which achieves short cycle times for the compression molding portion of the process, in that the material that will comprise the shingle or tile is a thermoplastic material, that is applied in a hot, partially molten state, onto a pre-heated surface of a carrier plate and the carrier plate is then placed in a compression mold in which the shingle or tile is molded, with one surface being stamped during the molding process to have a desired surface aesthetic. The carrier plate includes a top layer against which the shingle material is applied and a bottom layer, both of which layers have heat conduction capability. The top layer has a high receptivity to being heated by induction heating, whereas the bottom layer has a lower receptivity to being heated by induction heating. While in the compression mold, heat from the top layer of the carrier plate is allowed to be transferred to the bottom layer of the carrier plate, to cool the top layer of the carrier plate and consequently to cool the shingle material disposed thereon, so that the shingle material can be more quickly removed from the compression molding apparatus than with prior art types of compression molding of thermoplastic shingles or tiles.

The present invention is also directed to providing a carrier plate having the characteristics described above.

Accordingly, it is a primary object of this invention to accomplish the compression molding of thermoplastic, generally polymeric shingles or tiles in a shorter time cycle than with prior art techniques.

It is a further object of this invention to accomplish the above object, using a multi-layer carrier plate, with the layer of the carrier plate that receives the hot, partially molten thermoplastic material thereon, being comprised of a material that has a high receptivity to being heated by induction heating, whereas the lower layer of the carrier plate has a lower receptivity to being heated by induction heating, such that heat transfer from the upper layer to the lower layer of the carrier plate while the carrier plate is in the compression mold, takes place more readily, allowing a shorter cycle of compression molding than with prior art techniques.

It is another object of this invention to accomplish the above objects, wherein the surface of the shingle material is stamped with a desired surface aesthetic, while in the compression mold.

It is yet another object of this invention to accomplish the above objects, wherein a plurality of carrier plates with hot, partially molten thermoplastic material applied thereto are serially delivered to an induction heater, and thereafter to a compression molding apparatus.

It is yet another object of this invention to accomplish the above objects, wherein the material that is to comprise the shingle is extruded onto a carrier plate, or onto a plurality of carrier plates to be serially delivered to the compression molding apparatus.

It is yet another object of this invention to accomplish the above objects, wherein the extruding step applies a double layer of thermoplastic material to the carrier plate, via a co-extrusion apparatus.

It is a further object of this invention to accomplish the above objects, wherein the carrier plate has an upper layer of surface material that is of substantially higher electrical resistivity than the electrical resistivity of the lower layer or carrier plate base.

It is a further object of this invention to accomplish the above objects, wherein the carrier plate surface material is a magnetic material, and wherein the carrier plate base is a non-magnetic material.

Other objects and advantages of the present invention will be readily understood upon a reading of the following brief descriptions of the drawing figures, detailed descriptions of the preferred embodiments and the appended claims.

BRIEF DESCRIPTIONS OF THE DRAWING FIGURES

FIG. 1 is a schematic illustration of an apparatus for accomplishing the method of this invention, wherein carrier plates are formed by applying a carrier plate surface material to a carrier plate base, to which the carrier plate surface material is bonded, and then delivering the carrier plate thus formed to an induction heater, wherein the carrier plate surface material is heated to a higher temperature than the temperature of the carrier plate base, via induction heating, and wherein carrier plates thus treated are delivered past an extruder, preferably of the co-extruder type, wherein a hot, partially molten thermoplastic material, preferably of a polymeric type is applied to the surface material of the carrier plate, wherein the thermoplastic material that is to be formed into a shingle or tile, is kept sufficiently warm due to its presence against the induction heated surface material of the carrier plate, and wherein the carrier plates are serially delivered to a compression molding apparatus, in which the desired configuration of the shingle material takes place, including a stamping of an upper portion of the shingle material to a desired aesthetic, with the shingle material that is being compression molded is cooled by means of transfer of heat from the shingle material and the carrier plate surface material, to the carrier plate base, to facilitate cooling of the shingle material while it is in the compression mold, to shorten the required cycle time of the shingle material in the compression mold.

Figure 2:
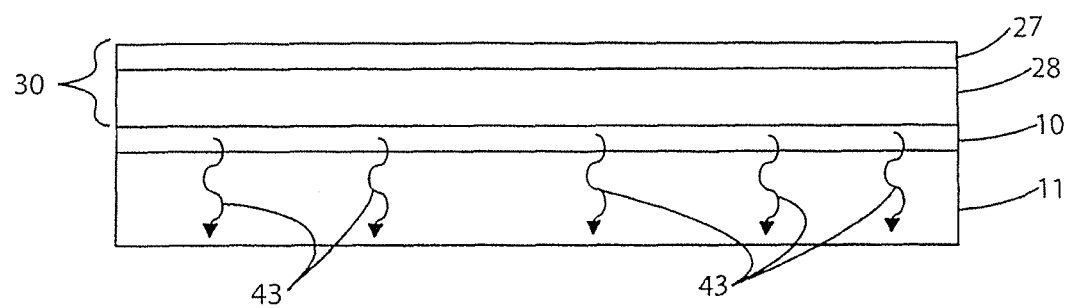

FIG. 2 is a schematic representation of a carrier plate in accordance with this invention, with shingle material thereon, and wherein heat transfer takes place between the carrier plate surface material and the carrier plate base.

DETAILED DESCRIPTIONS OF THE PREFERRED EMBODIMENTS

Referring now to FIG. 1 in detail, it will be seen that a carrier plate surface material 10 that has a high receptivity to being heated by induction heating and preferably having a high electrical resistivity, is supplied to a carrier plate base 11 and preferably bonded thereto. The carrier plate base 11 has a low receptivity to being heated by induction heating and preferably a lower electrical resistivity than the electrical resistivity of the carrier plate surface material 10. The carrier plate surface material 10 may be a magnetic material, whereas the carrier plate base 11 may be a non-magnetic material. Examples of the surface material 10 could be materials containing a substantial amount of carbon, steel, tin, or tungsten, or any combination thereof, including alloys thereof. Examples of materials that can comprise the carrier plate base 11 would be materials containing a substantial amount of aluminum, brass, copper or any combination thereof, including alloys thereof.

Upon bonding the carrier plate surface material 10 to the carrier plate base 11, a carrier plate 12 is formed.

A plurality of carrier plates 12, thus formed, are delivered, by any suitable means, as shown by the arrows 13, 14, past or through an induction heater 15. One way of doing so would be to apply the carrier plates 12 to the upper run 13 of a conveyor mechanism 14, being driven by means not shown, in the direction of the arrow 15, such that carrier plates 12 are serially delivered past an applicator 16 for receipt of a preferably polymeric, hot, partially molten thermoplastic material onto an upper surface of the carrier plates as shown at 17.

The applicator 16 will preferably be of the extruder type, and more preferably be of the type having twin screws 18, 20, suitably driven by drive means 21 to co-extrude the thermoplastic material 17, preferably comprising two distinct layers, onto the carrier plates 12.

The induction heating apparatus 15 preferably comprises a plurality of induction heating coils 22, connected by suitable electric lines 23, 24, to a source 25 of electrical power.

It will be noted that the carrier plate surface material 10 of the carrier plates 12 is a substantially thinner material than the carrier plate base 11. The induction heater 15 heats the skin or carrier plate surface material 10 more readily than it heats the carrier plate base 11.

The material 17 that is extruded onto the carrier plates 12 will preferably comprise a capstock material 27 and a core material 28. The capstock material will generally be a material that comprises at least the outer, weather-exposed portion of a shingle or tile, when the shingle or tile is laid up on a roof. As such, the capstock material may have various characteristics, such as being algae-resistant, being comprised of chemicals that provide color retention and/or ultraviolet resistance, and perhaps many other characteristics. The core material 28 generally need not have such characteristics, and will be thicker, as shown in detail "A" of FIG. 1, than the capstock material 27. The core material 28 may optionally have various fillers therein, and will generally be of a less expensive material than that of the capstock 27.

The carrier plates 12, with the shingle material 30 thereon, are then preferably delivered past a severing device 31, for severing the material 30 thereon between adjacent carrier plates 12, via a severing blade 32 or the like, which can be reciprocated upwardly and downwardly as shown by the double headed arrow 33 of FIG. 1.

Thereafter, another conveyor mechanism such as the conveyor belt 34, assisted by a walking beam type of conveyor 35 or other mechanism, serially delivers the carrier plates 12 with the shingle-forming material thereon, to a compression molding apparatus 36 having a vertically movable head 37 thereon, driven upwardly and downwardly as shown by the double-headed arrow 38, so that an upper die 40 thereof can engage against the upper surface of the shingle material, and stamp a desired surface aesthetic thereon, while the lower die 41 supports the carrier plate 12 with the shingle material thereon.

It will be understood that the upper surface of each carrier plate has a predetermined surface configuration for forming a desired lower surface configuration for the shingle or tile that is to be molded in the compression mold 36.

With reference to detail "B" of FIG. 1, it will be seen that a predetermined desired surface aesthetic 42 is formed in the upper surface of the capstock material 27, by means of stamping, via the upper die 40, during the compression molding process in the compression mold 36.

Normally, compression molding takes a greater amount of time than with the process in accordance with the instant invention. This additional time is usually caused in part because the carrier plates are heated to assist processing. With the present invention, the thermoplastic, preferably polymeric material, adheres to the hot upper surface of the carrier plate, which is a beneficial feature, because it prevents shifting of the thermoplastic material on the carrier plate during the various transfer operations that occur during the process. Also, by keeping the thermoplastic material in contact with the carrier plate at an elevated temperature, it is possible to produce a higher quality molded part, avoiding waves or other undesirable characteristics on the upper surface, and avoiding poorly filled ribs on the bottom of the shingle material during the compression molding process.

Thus, while having at least the upper surface of the carrier plate hot during the molding process and keeping the thermoplastic material warm during transfer and molding, such normally hinders the ability to reduce the cycle time, because the majority of the cooling takes place through the bottom die 41 on the cavity side of the mold.

In the preferred embodiment both the carrier plate surface material 10 and the carrier plate base should have excellent heat conduction characteristics. The carrier plate base 11 would preferably be at room temperature or some temperature below 200° F. The carrier plate surface material 10 would preferably be at a temperature higher than 200° F., and certainly no less than that temperature.

The induction heater 15 elevates the temperature of the carrier plate surface material 10, leaving the temperature of the carrier plate base 11 at or near its starting point.

By induction heating the carrier plate surface material 10, this layer of the carrier plate keeps the thermoplastic material in its partially molten state, thereby at a temperature appropriate for further processing, including compression molding.

With reference now to FIG. 2, it will be seen that the lines 43 simulating heat transfer reflect the cooling of the shingle material 30, as heat is transferred from the carrier plate surface material 10 to the carrier plate base 11, largely because both layers 10, 11 have good heat conduction characteristics, but that the carrier plate surface material 10 can readily be cooled by the transfer of heat to the carrier plate base 11, allowing the cooling of the thermoplastic material 30 that comprises both capstock 27 and core 28 to occur more readily, and thereby shorten the cycle time of presence of the shingle material in the compression mold 36.

It will be apparent from the forgoing that various modifications may be made in the operation of the process, and in the details of the various components of the process, as well as in the construction of the carrier plates, and the use of the thermoplastic material that is to be cooled by means of the method of this invention, all within the spirit and scope of the invention as defined in the appended claims.

What is claimed is:

1. A method of shortening the cycle time required to compression mold a roofing product, comprising the steps of:
   (a) providing a carrier plate that has a base and a surface material;
   (b) delivering the carrier plate to an induction heater and induction heating the carrier plate surface material to raise the temperature of the carrier plate surface material;
   (c) then delivering the carrier plate to an extruding means and extruding a hot, partially molten thermoplastic material onto the surface material of the carrier plate;
   (d) then, while the raised temperature of the carrier plate surface material keeps the extruded thermoplastic material in a partially molten state, delivering the carrier plate to a compression molding means and compression molding the thermoplastic material to a desired configuration while it is on the carrier plate surface material;
   (e) cooling the thermoplastic material by allowing heat transfer from the surface material of the carrier plate to the base of the carrier plate; wherein the improvement comprises:
   (f) the carrier plate base having a heat conduction capability and is comprised of a material that has a first level of receptivity to being heated by induction heating;
   (g) the carrier plate surface material comprising an exterior surface of the carrier plate and comprising a surface means for receiving hot, partially molten thermoplastic material thereon, with the surface material having heat conduction capability and is comprised of a material that has a second level of receptivity to being heated by induction heating, with said second level of receptivity being higher than said first level of receptivity;
   (h) with the carrier plate surface material being in bonded relation to the carrier plate base;
   (i) wherein the carrier plate base is responsive to receiving heat transferred thereto from the carrier plate surface material; and
   (j) wherein the carrier plate surface material is responsive to being cooled by heat transfer from the carrier plate surface material to the carrier plate base.

2. The method of claim 1, wherein the carrier plate surface material comprises a metal material.

3. The method of claim 1, wherein the carrier plate base is at a temperature below 200° F.

4. The method of claim 1, wherein the carrier plate surface material is substantially thinner than the carrier plate base.

5. The method of claim 1, wherein the carrier plate surface material comprises a thin skin.

6. The method of claim 1, wherein the carrier plate surface material is a material of higher electrical resistivity than the electrical resistivity of the carrier plate base.

7. The method of claim 1, wherein the carrier plate surface material comprises a magnetic material and wherein the carrier plate base comprises a non-magnetic material.

8. The method of claim 1, wherein the carrier plate surface material is selected from the group consisting of a material containing a substantial amount of any of:
   (i) carbon;
   (ii) steel;
   (iii) tin;
   (iv) tungsten; and
   (v) any combination of any of the materials of (i) through (iv).

9. The method of claim 1, wherein in the carrier plate base is a material selected from the group consisting of a material containing a substantial amount of any of:
   (i) aluminum;
   (ii) brass;
   (ii) copper; and
   (iv) any combination of any of the materials (i) through (iii).

10. A method of shortening the cycle time required to compression mold a product, comprising the steps of:
    (a) providing a carrier plate that has a base and a surface material;
    (b) delivering the carrier plate to an induction heater and induction heating the carrier plate surface material to raise the temperature of the carrier plate surface material;
    (c) then delivering the carrier plate to an extruding means and extruding a hot, partially molten thermoplastic material onto the surface material of the carrier plate;

(d) then, while the raised temperature of the carrier plate surface material keeps the extruded thermoplastic material in a partially molten state, delivering the carrier plate to a compression molding means and compression molding the thermoplastic material to a desired configuration while it is on the carrier plate surface material;

(e) cooling the thermoplastic material by allowing heat transfer from the surface material of the carrier plate to the base of the carrier plate; wherein the improvement comprises:

(f) the carrier plate base having a heat conduction capability and is comprised of a material that has a first level of receptivity to being heated by induction heating;

(g) the carrier plate surface material comprising an exterior surface of the carrier plate and comprising a surface means for receiving hot, partially molten thermoplastic material thereon, with the surface material having heat conduction capability and is comprised of a material that has a second level of receptivity to being heated by induction heating, with said second level of receptivity being higher than said first level of receptivity;

(h) with the carrier plate surface material being in bonded relation to the carrier plate base;

(i) wherein the carrier plate base is responsive to receiving heat transferred thereto from the carrier plate surface material; and (j) wherein the carrier plate surface material is responsive to being cooled by heat transfer from the carrier plate surface material to the carrier plate base.

11. The method of claim 10, wherein the carrier plate surface material comprises a metal material.

12. The method of claim 10, wherein the carrier plate base is at a temperature below 200° F.

13. The method of claim 10, wherein the carrier plate surface material is substantially thinner than the carrier plate base.

14. The method of claim 10, wherein the carrier plate surface material comprises a thin skin.

15. The method of claim 10, wherein the carrier plate surface material is a material of higher electrical resistivity than the electrical resistivity of the carrier plate base.

16. The method of claim 10, wherein the carrier plate surface material comprises a magnetic material and wherein the carrier plate base comprises a non-magnetic material.

17. The method of claim 10, wherein the carrier plate surface material is selected from the group consisting of a material containing a substantial amount of any of:
(i) carbon;
(ii) steel;
(iii) tin;
(iv) tungsten; and
(v) any combination of any of the materials of (i) through (iv).

18. The method of claim 10, wherein in the carrier plate base is a material selected from the group consisting of a material containing a substantial amount of any of:
(i) aluminum;
(ii) brass;
(ii) copper; and
(iv) any combination of any of the materials (i) through (iii).

* * * * *